Aug. 31, 1937.  G. B. C. STEFFAN ET AL  2,091,422
BUN PAN
Filed June 3, 1936
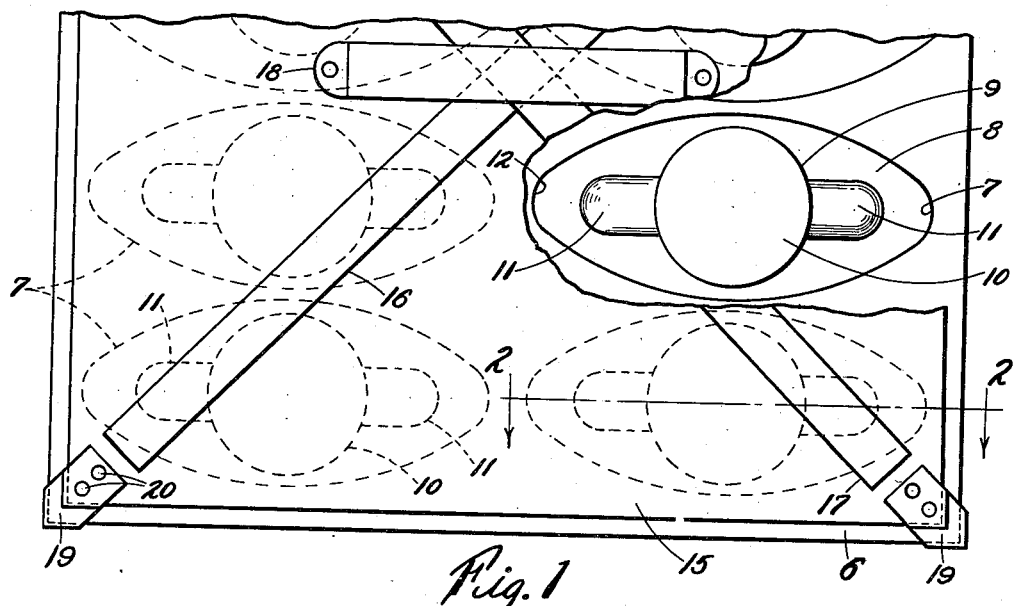
Fig. 1
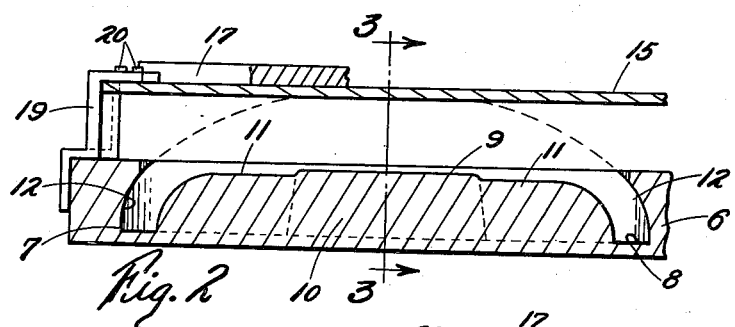
Fig. 2
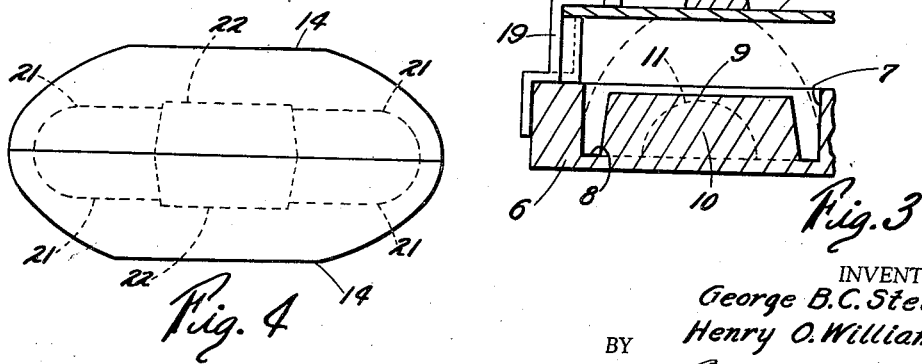
Fig. 3
Fig. 4
INVENTORS
George B. C. Steffan
Henry O. Williams
BY
Murray & Zugelter
ATTORNEYS Patented Aug. 31, 1937

2,091,422

UNITED STATES PATENT OFFICE 2,091,422

BUN PAN

George B. C. Steffan and Henry O. Williams, Joliet, Ill., assignors to The Lockwood Manufacturing Company, Cincinnati, Ohio, a corporation of Ohio Application June 3, 1936, Serial No. 83,320

3 Claims. (Cl. 53—6)

This invention relates to a bun pan.

An object of the invention is to provide a pan for baking half sections of buns or the like, whilst forming an inset in the center of the bun for receiving a desirable filler.

Another object of the invention is to provide a means of forming a flat portion on the lower outer surface of a prepared bun to prevent its rolling or tilting when being served.

A further object is to provide a means of baking half sections of buns, two of which are placed together to form a unit, the center of the unit being hollow to provide a space for a suitable filler.

A still further object of the invention is to provide a means of making a sandwich of two half sections of buns which in prepared condition or when eaten, will effectively retain the filler and an added relish.

Other objects will be apparent from the following specification and drawing, in which:

Fig. 1 is a fragmental plan view of our baking pan, part of the plate being broken away to disclose one receptacle or pan.

Fig. 2 is an elevational cross sectional view taken on line 2—2 of Fig. 1.

Fig. 3 is a cross sectional view taken on line 3—3 of Fig. 2.

Fig. 4 is an elevational view of a completed sandwich unit.

Generally, our device consists of a number of pans or receptacles fastened together to form a pan unit. Each receptacle has an upwardly projecting offset formed in the bottom thereof. The pan or receptacle is so formed that a half section of a bun may be baked in it; the off-set serving to form an inset in the central part of the baked bun. When two half sections are placed together as in Fig. 4, a closed central space will result which will receive a filler. As illustrated in the accompanying drawing, the filler for our bun is what is commonly called a "frankfurter" and for what is commonly called a "hamburger". The offset portion in the bottom of each pan or receptacle will therefore be similar in form to a half of a frankfurter and hamburger. The bun after baking in the pan will have an inset corresponding to the offset in the bottom thereof. The filler of "hamburger" or "frankfurter" is then placed in the inset in one half section of the bun, a desired relish applied to it, and a similar bun positioned over it. In this manner, a sandwich can be made conveniently which effectively prevents the filler from extending beyond the sides of the sandwich. The relish applied to the filler will also be retained in the sandwich to prevent the usual dripping and the various inconveniences relative thereto. Our bake pan also produces a bun which has a hard, brown surface. When a juicy filler or relish is used, the hard surface acts to prevent the bun from becoming damp, thus producing a desirable dry bun and a juicy filler and relish. Evidently, our device may be changed in form to produce all shapes and kinds of cakes or buns having different shaped insets without departing from the spirit of the invention.

The embodiment of our invention consists of a pan unit having a body portion 6. A plurality of elliptical pans or receptacles 7 are formed in the body portion either by a stamping operation or by a casting one. These receptacles contain a bottom 8 which has an upwardly projecting offset 9. The offset portion of the bottom has a circular portion 10 located centrally of the receptacle, and also an elongated portion 11 extending radially from opposite sides of the circular portion 10. This offset is therefore in the shape of half of a combination "hamburger" and "frankfurter". The end walls 12 of the receptacles are circular and converge inwardly to impart curved ends to the buns 13 (Fig. 2).

To provide a flat surface 14 to the buns, a plate 15 is positioned above all the receptacles. When the buns are being baked this plate hinders their rising, thus imparting to the baked bun a flat surface. The plate has two reenforcing straps 16 and 17 fastened to its upper surface to prevent warping and to provide against bending and flexing. A handle 18 is fastened to the plate for its easy manipulation.

As disclosed in the drawing, the pan body and the plate are substantially square, and it is therefore necessary to provide four-corner pieces 19 which are fastened to the plate by rivets 20 and removably engage the pan body at its corners. The corner pieces are formed to engage both the converging sides at the corner of the pan body thus preventing the shifting of the plate relative to the pan body.

A prepared sandwich composed of two half sections of buns which have been baked in our pan is shown in Fig. 4. The two elongated insets 21 in each half of the two buns form a closed space for receiving a frankfurter. In the event that a hamburger would be the desirable filler it could be placed in the circular closed space 22. In each case, a space will be without a filler into which may be placed a desirable relish. The flat portions 14 on the outer surface of the buns are formed by the plate 15 and serve to prevent the sandwich from rolling and tilting.

What is claimed is:

1. A pan unit for baking half sections of buns, comprising a body portion, a plurality of shallow, elliptical receptacles formed in the body portion and placed in spaced relationship, an offset projecting upwardly from the bottom of each receptacle and comprising a centrally located, circular portion and an elongated portion extending radially from opposite sides of the circular portion and in the direction of the greatest width of the elliptical receptacle, the offset portion forming a corresponding inset in a baked bun or the like, a plate, corner pieces fastened to the plate and adapted to removably engage the body portion and means on the corner pieces to prevent shifting of the plate, the plate being adapted to form flat portions on the outer surfaces of the baked buns or the like.

2. A pan unit for baking half sections of buns and the like comprising a plurality of shallow elliptical receptacles held in spaced relationship, an offset projecting upwardly from the bottom of each receptacle and comprising a centrally located, circular portion and an elongated portion extending radially from opposite sides of the circular portion and in the direction of the greatest width of the elliptical receptacle, the offset portion forming a corresponding inset in a baked bun or the like, a plate, corner pieces fastened to the plate and holding it in spaced relationship with the receptacles and means or the corner pieces to prevent shifting of the plate, the plate being adapted to form flat portions in the outer surface of the baked buns or the like.

3. A pan unit for baking half sections of buns and the like, comprising a plurality of shallow, elliptical receptacles held in spaced relationship, an offset projecting upwardly from the bottom of each receptacle and comprising a centrally located circular portion and two elongated portions extending radially from opposite sides of the circular portion and in the direction of the greatest width of the elliptical receptacle, the offset portion forming a corresponding inset in a baked bun or the like, and a plate positioned above the receptacle to form flat portions in the outer surface of the baked bun or the like.

GEORGE B. C. STEFFAN.
HENRY O. WILLIAMS.